(12) United States Patent
Wu

(10) Patent No.: US 9,021,326 B2
(45) Date of Patent: Apr. 28, 2015

(54) METHOD, APPARATUS AND SYSTEM FOR TRANSMITTING DATA ON DIGITAL SUBSCRIBER LINE

(75) Inventor: Anni Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 724 days.

(21) Appl. No.: 13/270,026

(22) Filed: Oct. 10, 2011

(65) Prior Publication Data

US 2012/0089881 A1    Apr. 12, 2012

Related U.S. Application Data

(63) Continuation of application No. PCT/CN2010/071652, filed on Apr. 9, 2010.

(30) Foreign Application Priority Data

Apr. 9, 2009    (CN) .......................... 2009 1 0106640

(51) Int. Cl.
*H04L 1/18*    (2006.01)
*G08C 25/02*    (2006.01)
*H04L 1/00*    (2006.01)

(52) U.S. Cl.
CPC ....... *H04L 1/1887* (2013.01); *H04L 2001/0098* (2013.01)

(58) Field of Classification Search
CPC ..... H04W 24/02; H04W 28/06; H04W 88/08; H04W 52/42; H04B 7/0413; H04B 7/0417; H04L 1/1835; H04L 12/1863; H04L 12/66; H04L 1/001; H04L 1/0045; H04L 1/0057; H04L 1/0071; H04L 1/1858; H04L 47/14; H04L 1/18; H04L 2001/0098; H04L 1/1812; H04L 1/1874; H04L 1/0083; H03M 13/1515; H03M 13/6306; H03M 13/6533

USPC .................. 714/748–751, 4.1, 768, 784, 701, 714/E11.001, E11.032, E11.131; 375/267, 375/219, 316; 370/390, 400; 455/219, 227

See application file for complete search history.

(56) References Cited

U.S. PATENT DOCUMENTS 7,257,220 B1    8/2007    Marshall et al.
2008/0212589 A1    9/2008    Yang
(Continued)

FOREIGN PATENT DOCUMENTS

CN    1667991 A    9/2005
CN    1909511 A    2/2007
(Continued)

OTHER PUBLICATIONS

Written Opinion of the International Searching Authority dated Jun. 17, 2010 in connection with International Patent Application No. PCT/CN2010/071652.
(Continued)

*Primary Examiner* — Guy Lamarre

(57) ABSTRACT

A method includes the following steps: sorting service data into retransmissive service data and non-retransmissive service data; allocating resources to the retransmissive service data and the non-retransmissive service data respectively, and encapsulating the data into DTUs according to the allocated resources; sending, by a sender, the DTU that bears the service data; receiving, by the sender, a retransmission request that is sent according to a result of judging a bit error and a type of the retransmissive service, where the retransmission request carries information about the DTU that needs to be retransmitted; and retransmitting, by the sender, a corresponding DTU that bears the retransmissive service data requested for retransmission.

10 Claims, 8 Drawing Sheets

(56) References Cited

U.S. PATENT DOCUMENTS

2009/0003376 A1     1/2009   Horvat et al.
2009/0089641 A1*   4/2009   Schedelbeck et al. ........ 714/748
2009/0282312 A1*   11/2009   Liu ............................... 714/751

FOREIGN PATENT DOCUMENTS

CN     101321046 A     12/2008
CN     101335604 A     12/2008

OTHER PUBLICATIONS

Supplementary European Search Report dated Jan. 19, 2012 in connection with European Patent Application No. EP 10 76 1207.
International Search Report dated Jun. 17, 2010 in connection with International Patent Application No. PCT/CN2010/071652.
Office Action dated Nov. 27, 2012 in connection with Chinese Patent Application No. 200910106640.X.

\* cited by examiner

| Non-retransmissive service data |
|---|
| Non-retransmissive service data |
| Retransmissive service data |
| Retransmissive service data |
| Retransmissive service data |

FIG. 3a

| Non-retransmissive service data | Retransmissive service data | Non-retransmissive service data | Retransmissive service data |
|---|---|---|---|

FIG. 3b

METHOD, APPARATUS AND SYSTEM FOR TRANSMITTING DATA ON DIGITAL SUBSCRIBER LINE

CROSS-REFERENCE TO RELATED APPLICATIONS

This application is a continuation of International Application No. PCT/CN2010/071652, filed on Apr. 9, 2010, which claims priority to Chinese Patent Application No. 200910106640.X, filed on Apr. 9, 2009, both of which are hereby incorporated by reference in their entireties.

TECHNICAL FIELD

The present invention relates to communication technologies, and in particular, to a method, an apparatus, and a system for transmitting data on a Digital Subscriber Line (DSL).

BACKGROUND

DSL is a high-speed transmission technology that transmits data through a telephone twisted pair, namely, an Unshielded Twist Pair (UTP). The twisted pairs used by the DSL are unshielded, and electromagnetic interference between line pairs generates bit errors, so transmission quality of the line is deteriorated.

In an existing DSL system, an error-correcting code is generally used to correct errors generated in the sent data. For example, Reed-Solomon (RS) codes are used to mitigate the impact caused by the impulse noise by virtue of the code gain provided additionally by the RS codes, so as to increase the stability of the DSL system. However, with the increase of the DSL bandwidth and the increase of the rate, when an original RS code is used, a RS codeword with more check bytes and shorter length is needed. In this case, a net gain of the RS code changes to a negative value, which is adverse to the increase of the rate.

When the system is required to provide high impulse noise protection, and a small delay is required, the RS code will introduce more redundancy (namely, check bytes), which makes the net gain of the code be negative and make the rate decrease. In more circumstances, the Impulse Noise Protection (INP) provided by the system is unable to tackle the bit errors of data caused by the impulse noise in the line. When a set noise margin is small, the RS coding is mainly designed to tackle the impact (namely, bit errors) caused by a stable noise onto the DSL system. In this case, the capability of the system in resisting the impulse noise is further weakened.

In order to better tackle the impact caused by the impulse noise onto the DSL system, a physical-layer retransmission scheme emerges accordingly, especially a retransmission mechanism at a Physical Media Specific Transmission Convergence (PMS-TC) sublayer. The retransmission mechanism is capable of retransmitting the data damaged by the impulse noise, so as to reduce a bit error rate of the line and improve the service stability. This technology alleviates the impact caused by the impulse noise on the system to some extent and improves the service stability of the system at the cost of increasing a service delay and reducing a net rate of the line. In the existing DSL system, the PMS-TC layer is incapable of acquiring a service type of the data at the PMS-TC layer, and the same path may bear multiple services at the same time. An existing retransmission system at the PMS-TC layer additionally increases a delay by more than 10 ms. For services (such as a video service) having high requirements for the bit error rate but low requirements for the delay, the retransmission technology reduces the bit error rate of the line and improves Quality of Experience (QoE) of a user in a range of a tolerable delay. However, some services (such as VoIP) having low requirements for the bit error rate but high requirements for the delay still exist in a network, and the delay increased by retransmission for such services is intolerable to the user, which greatly affects the QoE of the user, and even may causes complaints of the user.

SUMMARY

The present invention is directed to provide a method, an apparatus, and a system for transmitting data on a DSL that supports service-specific PMS-TC layer retransmission.

Technical solutions of the present invention are as follows:

A method for transmitting data on a DSL includes the following steps:

sorting service data into retransmissive service data and non-retransmissive service data at a retransmission layer at a PMS-TC layer;

allocating resources to the retransmissive service data and the non-retransmissive service data, and encapsulating the data into a Data Transfer Unit (DTU) according to the allocated resources;

sending, by a sender, the DTU that bears the service data;

receiving, by the sender, a retransmission request that is sent according to a result of judging a bit error and a type of the retransmissive service, where the retransmission request carries information about the DTU that needs to be retransmitted; and retransmitting, by the sender, a corresponding DTU, where the DTU bears the retransmissive service data requested for retransmission.

A DSL transceiver for sending and receiving data includes:

a service type sorting module, configured to sort service data into retransmissive service data and non-retransmissive service data;

a retransmission judging module, configured to judge whether service data requested for retransmission includes the retransmissive service data; and refuse to retransmit the service data if no retransmissive service data is included; and a resource allocating module, configured to: allocate proper number of RS codewords to the two types of services at granularity of RS codewords in a DTU, or allocate an integer number of DTUs to the two types of services.

A system for transmitting data on a DSL includes:

a central office device, configured to send data to a Customer Premises Equipment (CPE) and receive data sent by the CPE; and a CPE, connected to the central office device and configured to receive data from the central office device and send data to the central office device, where the CPE further includes a retransmission judging module, which is configured to: judge whether any bit error exists in the received data; send no retransmission request message to the central office device if no bit error exists; if any bit error exists, further judge whether a service to which a DTU belongs is retransmissive service data; send no retransmission request message to the central office device if the DTU includes non-retransmissive service data, or send a retransmission request message to the central office device if part or all of data in the DTU includes retransmissive service data.

The present invention has the following beneficial effects. According to embodiments of the present invention, the services at the retransmission layer at the PMS-TC layer are sorted into retransmissive services and non-retransmissive services. The scheme is capable of retransmitting the retransmissive service data damaged by the impulse noise, but incapable of retransmitting the damaged non-retransmissive service data. In this way, the system can overcome the impact caused by the impulse noise, reduce the bit error rate of the line, improve the system stability and the QoE of the user, and provide better services for the user.

BRIEF DESCRIPTION OF THE DRAWINGS

FIG. 3a is a schematic diagram of sorting services at granularity of RS codewords according to an embodiment of the present invention;

FIG. 3b is a schematic diagram of sorting services at granularity of DTUs according to an embodiment of the present invention;

DETAILED DESCRIPTION

Figure 1:
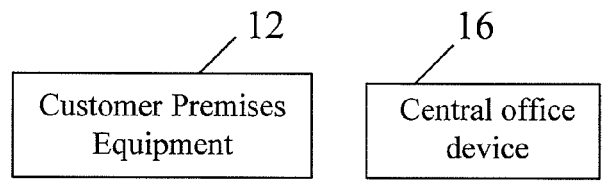
FIG. 1 is a schematic diagram of a system architecture according to an embodiment of the present invention.

As shown in FIG. 1, a system for transmitting data on a DSL in an embodiment of the present invention includes: a CPE 12 and a central office device 16. The CPE 12 is generally a DSL modem or a DSL transceiver, and is connected with the central office device 16. The CPE 12 may send data to the central office device 16, and meanwhile receive and process data sent by the central office device 16. The system further includes an enclosure, a sending unit, and a receiving unit. The sending unit and the receiving unit are set in the enclosure, and are used for sending and receiving data. The central office device 16 is a Digital Subscriber Line Access Multiplexer (DSLAM) or other form of DSL transceiver. The DSLAM also includes an enclosure, a sending unit, and a receiving unit. The sending unit and the receiving unit are set in the enclosure, and are used for sending and receiving data.

In this embodiment, a case that the central office device 16 is a sender and the CPE 12 is a receiver is merely taken as an example for illustration. In fact, the CPE 12 may also be a sender and the central office device 16 may be a receiver.

Figure 2:
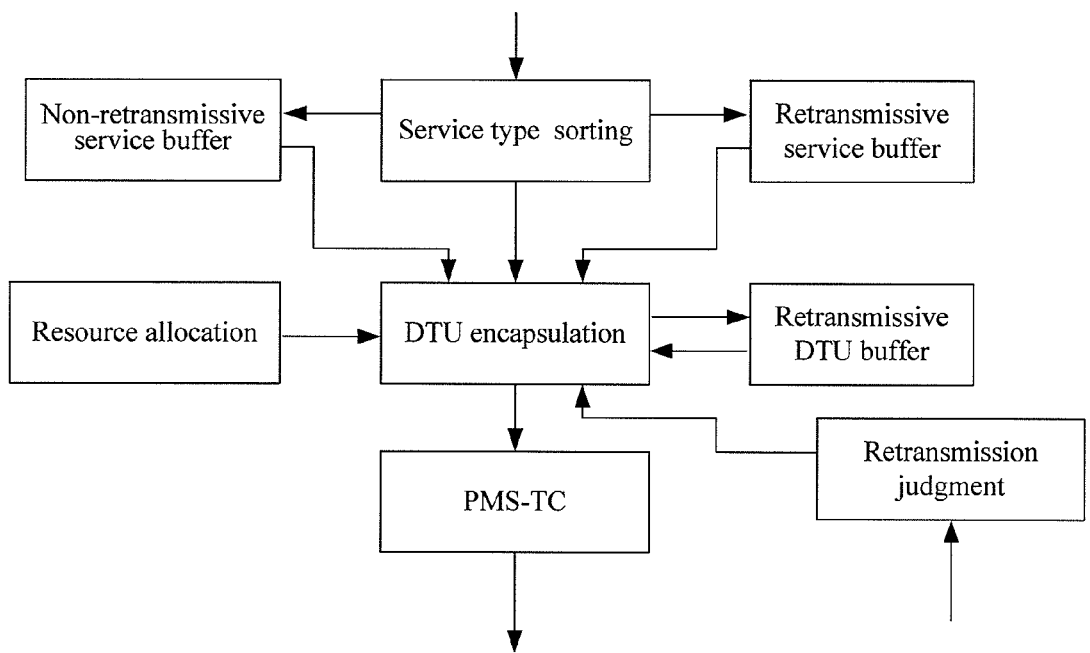
FIG. 2 is a schematic diagram of a Digital Subscriber Line Access Multiplexer (DSLAM) according to an embodiment of the present invention.

As shown in FIG. 2, the central office device 16 further includes a service type sorting module, a resource allocating module, a DTU encapsulating module, and a retransmission judging module. The service type sorting module is configured to sort service data into retransmissive service data and non-retransmissive service data at the retransmission layer at the PMS-TC layer according to different requirements of delay and/or bit error rate, and store the two types of service data into two different data buffers respectively. The resource allocating module allocates proper number of RS codewords to the two types of services at granularity of RS codewords in a DTU, and identifies the two types of service data in the DTU to differentiate the service type of the data, that is, to differentiate whether the service is a retransmissive service. The DTU encapsulating module performs data filling according to the resources allocated by the resource allocating module to the two types of services, so as to form a DTU and store the data into a retransmissive data buffer. The retransmission judging module judges whether the DTU requested for retransmission includes the retransmissive service data. If the DTU includes the retransmissive service data, the DTU encapsulating module retains the RS codewords occupied by the retransmissive service data of the DTU in the retransmissive data buffer, replaces the RS codewords occupied by the non-retransmissive service data with new service data of this type (unsent service data of this type), encapsulates the replaced DTU, and sends the encapsulated DTU to the CPE 12.

The resource allocating module may allocate RS codewords to a type of services in the retransmissive DTU statically at granularity of RS codewords, and allocate the RS codewords in fixed positions of the DTU to a certain type of services. As shown in FIG. 3a, the DTU includes 5 RS codewords, where the first two RS codewords are used to bear the non-retransmissive service data, and the last three RS codewords are used to bear retransmissive service data. The resource allocating module also may allocate RS codewords to a certain type of services in the retransmissive DTU dynamically at granularity of RS codewords. The positions of the RS codewords are not fixed, and the RS codewords are differentiated by specified identifiers. In this way, a part of a DTU may include retransmissive service data, and the other part of the DTU may include non-retransmissive service data; or, the whole DTU includes retransmissive service data, or the whole DTU is non-retransmissive service data.

Definitely, the resources may also be allocated at granularity of a DTU including multiple RS codewords. As shown in FIG. 3b, in a static allocation mode, an integer number of DTUs are properly allocated to non-retransmissive services periodically. In a dynamic allocation mode, an integer number of DTUs are properly allocated to the two types of services. However, the positions of the DTUs are not fixed, and the DTUs are differentiated by certain identifiers. Specific identifying modes are as follows.

(1) Use a Stream Identifier (SID) to judge whether a service is a retransmissive service, but it is required to keep record of the retransmissive type of the SID in the system, that is, to keep record of whether each SID corresponds to a retransmissive service or a non-retransmissive service; or (2) Use a bit identifier. For example, in an 8-bit identifier, $FE_{16}$ represents a retransmissive service, and $FF_{16}$ represents a non-retransmissive service; or, in a 1-bit identifier, 1 represents a retransmissive service, and 0 represents a non-retransmissive service.

In addition, when resources are allocated at granularity of DTUs, the DTUs are not necessarily identified, but the sender needs to record the service type of the corresponding DTU.

The principle for allocating resources to service data may be based on service traffic proportion, poll, or weight. For example, proper numbers of codewords are allocated to the corresponding type of service in a DTU according to the service traffic proportion of the retransmissive service to the non-retransmissive service. The codewords may be arranged in a regular order, or at random. When a DTU includes two types of service data, the service data is differentiated by identifiers, using RS codewords as granularity.

Figure 4A:
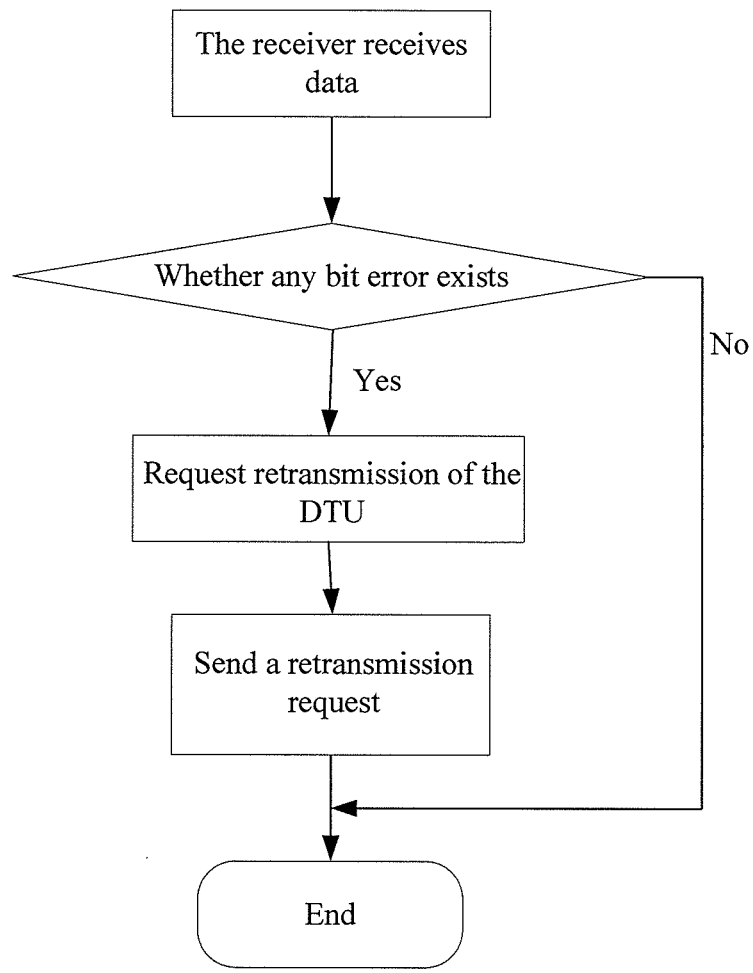
FIG. 4a is a flow chart of a receiver processing method according to a first embodiment of the present invention.

A method according to an embodiment of the present invention is as follows:

At the stage of initializing the system, a central office device 16 and a CPE 12 negotiate capabilities through management messages to determine whether to support a PMS-TC layer retransmission mechanism that differentiates service types. If the retransmission mechanism is supported, the operation is performed according to the following procedures: As shown in FIG. 4a, when the CPE 12 receives a DTU sent by the central office device 16, the CPE 12 judges whether to request retransmission of the corresponding DTU according to the information indicating whether the received DTU includes any bit error. If the received DTU includes bit errors, the CPE 12 sends a retransmission request message to the CPE 16, where the retransmission request message carries information about the DTU requested for retransmission. If the received DTU includes no bit error, no retransmission request message is sent to the central office device 16, and the subsequent processing is performed.

Figure 4B:
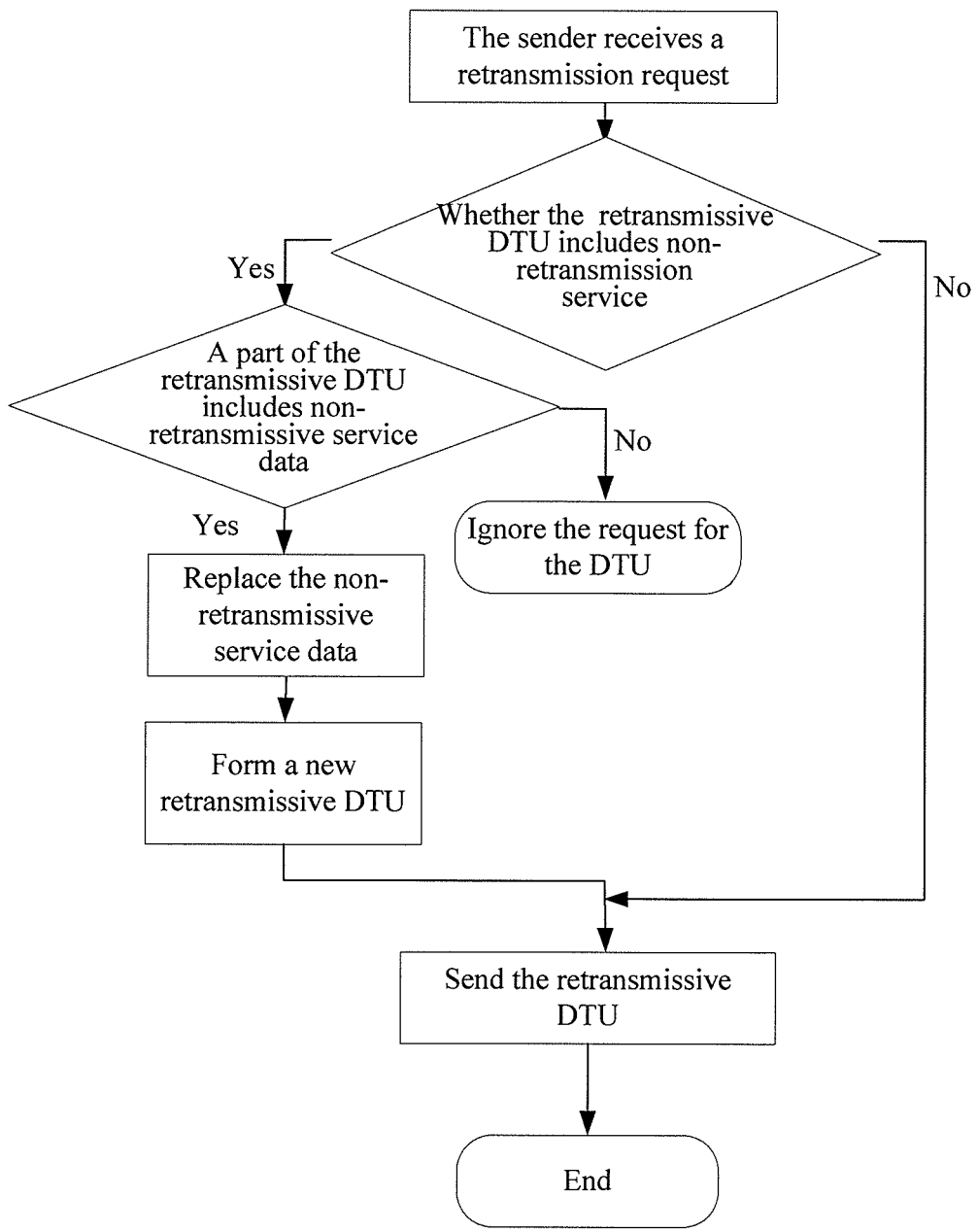
FIG. 4b is a flow chart of a sender processing method according to a first embodiment of the present invention.
Figure 5A:
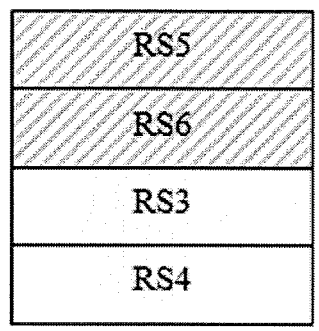
FIG. 5a-c is a schematic diagram of three data retransmission methods according to a first embodiment of the present invention.
Figure 5A:
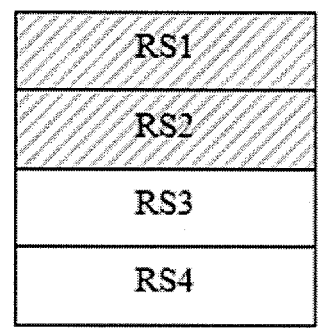
Figure 5B:
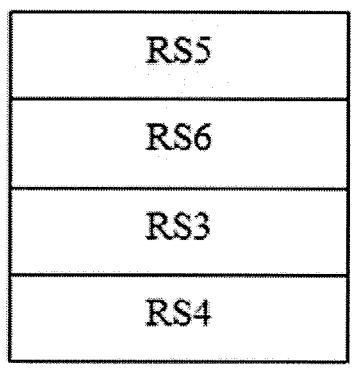
Figure 5B:
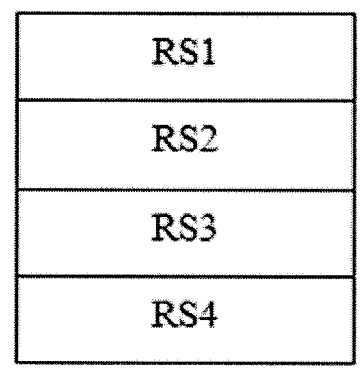
Figure 5C:
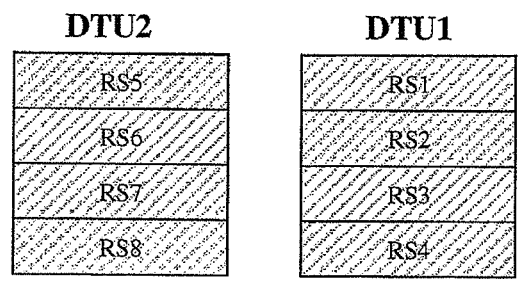

As shown in FIG. 4b, after receiving the retransmission request message, the central office device 16 further judges whether the DTU includes retransmissive service data according to the service type of the data in the requested DTU1. In a first case, as shown in FIG. 5a, the part with oblique lines represents the RS codewords allocated to the non-retransmissive service data; when a part of the DTU1 includes non-retransmissive service data RS1 and RS2, the data of the DTU1 is replaced at the time of retransmitting the DTU1. Non-retransmissive service data RS1 and RS2 are replaced with this type of new service data RS5 and RS6 (unsent data of this type) in the RS codewords occupied by the non-retransmissive service data RS1 and RS2. After the replacement, the DTU1 changes to DTU2, and the DTU2 is sent to the CPE 12 as a DTU requested for retransmission. In a second case, as shown in FIG. 5b, if all of 4 codewords RS1-RS4 in the DTU1 include retransmissive service data, the central office device 16 retransmits RS1-RS4 of DTU1 directly, and sends the DTU2 to the CPE 12 as a DTU requested for retransmission, where the DTU2 includes all RS1-RS4 codewords requested. In a third case, as shown in FIG. 5c, if all of RS1-RS4 codewords in the DTU1 include non-retransmissive service data, the retransmission request message of this DTU is ignored directly, and the DTU2 sent by the central office device 16 includes none of RS1-RS4 codewords.

Figure 6A:
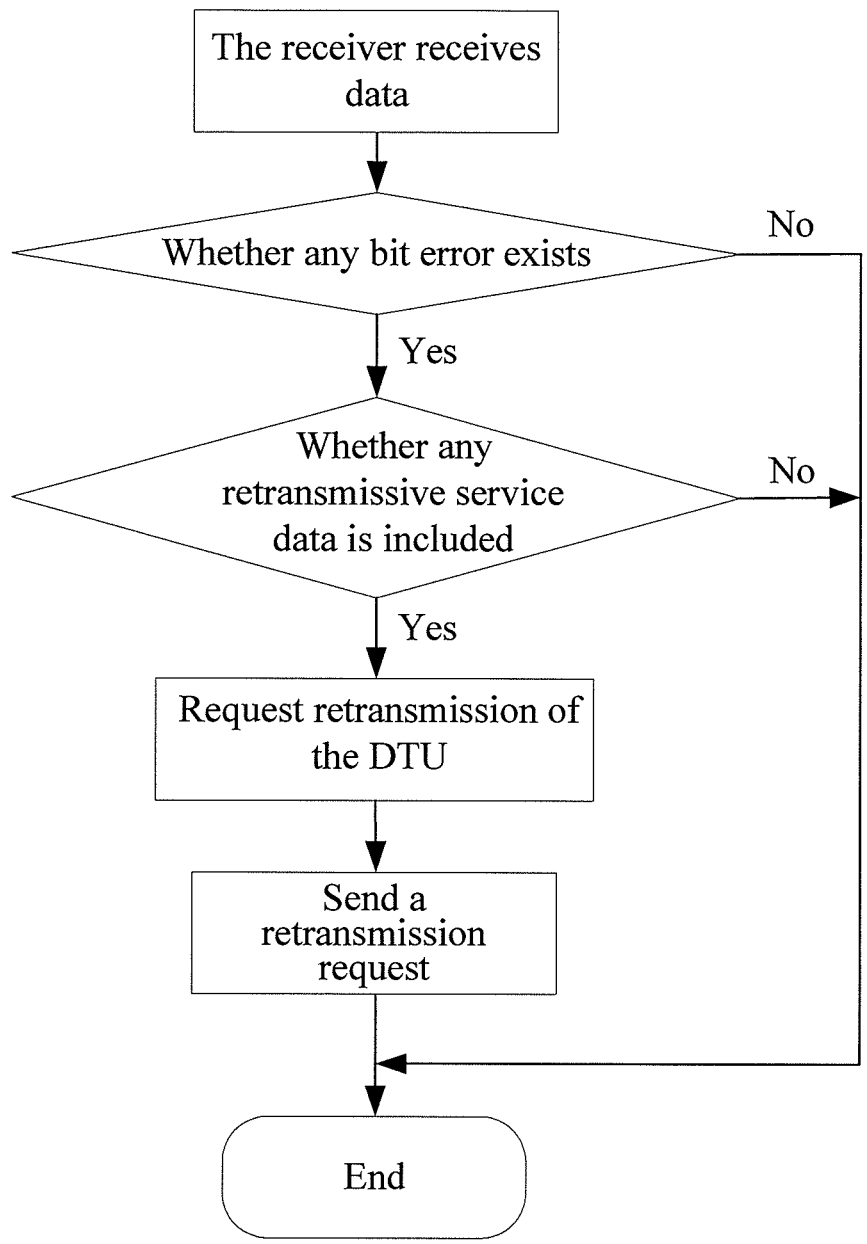
FIG. 6a is a flow chart of a receiver processing method according to a second embodiment of the present invention.

In another embodiment of the present invention, a CPE 12 is used to judge whether a service to which a DTU belongs is retransmissive service data. As shown in FIG. 6a, when the CPE 12 receives a DTU from the central office device 16, the CPE 12 judges whether the received data includes any bit error. If the received data includes no bit error, the CPE 12 does not need to send any retransmission request message to the central office device 16; if the received data includes bit errors, the CPE 12 further judges whether the service to which the DTU belongs is retransmissive service data. If the service type of the DTU is non-retransmissive service data, no retransmission request message is sent to the CPE 16, and the subsequent processing is performed. If part or all of the DTU includes retransmissive service data, a retransmission request message is sent to the central office device 16.

Figure 6B:
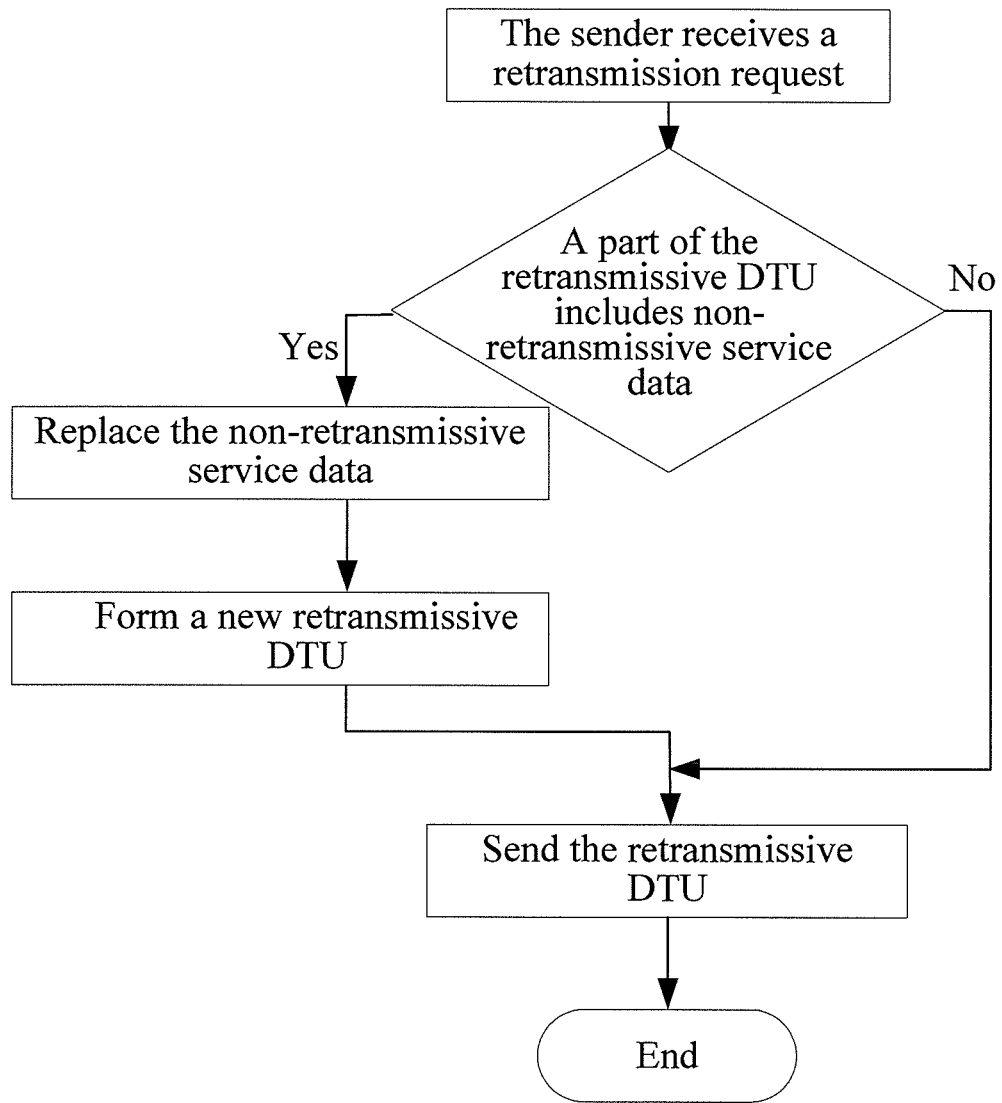
FIG. 6b is a flow chart of a sender processing method according to a second embodiment of the present invention.

As shown in FIG. 6b, the central office device 16 is a sender. After receiving a retransmission request message, the central office device 16 further judges whether a part of the DTU includes non-retransmissive service data. If a part of the DTU includes non-retransmissive service data, the central office device 16 replaces the non-retransmissive service data when retransmitting the DTU, and then sends the replaced DTU to the CPE 12. If the whole DTU includes retransmissive service data, the central office device 16 retransmits the DTU directly.

According to the embodiments of the present invention, at the retransmission layer at the PMS-TC layer, the services are sorted into retransmissive services and non-retransmissive services. The sender is capable of retransmitting the retransmissive service data damaged by the impulse noise, but is incapable of retransmitting the damaged non-retransmissive service data. In this way, the impact caused by the impulse noise onto the existing DSL system/device can be overcome, the impact caused by the retransmission mechanism of the PMS-TC layer onto the services which have high requirements for the delay and low requirements for the bit error rate can be relieved, the additional delay generated by the retransmission mechanism of the PMS-TC layer can be reduced, the QoE of the services which have high requirements for the delay but low requirements for the bit error rate can be improved, jitters can be reduced, and the system stability and net rate can be improved.

The descriptions above are exemplary embodiments of the present invention. In practice, persons of ordinary skill in the art may make appropriate improvements and modifications to the technical solutions of the present invention to meet the specific requirements. Therefore, the embodiments of the present invention are merely illustrative but shall not be intended to limit the protection scope of the present invention.

What is claimed is:

1. A method for transmitting data on a Digital Subscriber Line (DSL), the method comprising:
   sorting service data into retransmissive service data and non-retransmissive service data at a Physical Media Specific Transmission Convergence (PMS-TC) sublayer of a retransmission layer;
   allocating resources to the retransmissive service data and the non-retransmissive service data respectively, wherein granularity of the allocated resources is one of a DTU comprising multiple Reed-Solomon (RS) codewords and an RS codeword in the DTU, and encapsulating the data into a Data Transfer Units (DTU) according to the allocated resources;
   sending, by a sender, the DTU that bears the service data;
   receiving, by the sender, a retransmission request that is sent according to a result of the DTU having a bit error and service the DTU at least comprising retransmissive service data, wherein the retransmission request carries information about the DTU that needs to be retransmitted; and
   retransmitting, by the sender, a corresponding DTU, where the DTU bears the retransmissive service data requested for retransmission.

2. The method according to claim 1, wherein:
   before the sender retransmits the corresponding DTU, the method further comprises:
   replacing, by the sender, the non-retransmissive service data in the DTU requested for retransmission to form a new DTU, and retransmitting the new DTU.

3. The method according to claim 1, wherein:
   a mode for allocating resources comprises:
   in a static mode, allocating RS codewords in fixed positions in the DTU to a certain type of services, or allocating proper number of RS codewords or DTUs to a certain type of services periodically; and
   in a dynamic mode, allocating proper number of codewords or DTUs to the two types of services according to traffic proportion, poll, or weight.

4. The method according to claim 3, wherein:
   after the resources are allocated, a method for identifying the DTUs comprises:

(1) using a Stream Identifier (SID) to judge whether a service is a retransmissive service, which requires to keep a record of a retransmissive type of the corresponding SID in a system, namely, to keep a record of whether each SID corresponds to a transmission service or a non-retransmissive service; or (2) using a bit identifier comprising at least one of: an 8-bit identifier, where FE16 represents the retransmissive service and FF16 represents the non-retransmissive service; and a 1-bit identifier, where 1 represents the retransmissive service and 0 represents the non-retransmissive service.

5. The method according to claim 3, wherein: after the resources are allocated, the method further comprises:

recording, by the sender, whether a service type of the corresponding DTU is a retransmissive service or not.

6. A Digital Subscriber Line (DSL) transceiver for sending and receiving data, the DSL transceiver comprising:

a service type sorting module, configured to sort service data into retransmissive service data and non-retransmissive service data at a Physical Media Specific Transmission Convergence (PMS-TC) sublayer of a retransmission layer;

a retransmission judging module, configured to judge whether service data requested for retransmission comprises the retransmissive service data; and refuse to retransmit the service data if the service data requested for retransmission comprises no retransmissive service data; and a resource allocating module, configured to allocate proper number of Reed-Solomon (RS) codewords to the two types of services at granularity of RS codewords in a Data Transfer Unit (DTU), or allocate an integer number of DTUs to the two types of services.

7. The DSL transceiver according to claim 6, further comprising:

a DTU encapsulating module, configured to perform data filling according to the resources allocated by the resource allocating module to the two types of services, so as to form a DTU.

8. A system for transmitting data on a Digital Subscriber Line (DSL), the system comprising:

a central office device comprising the DSL transceiver of claim 6 and configured to send data to a Customer Premises Equipment (CPE) and receive data sent by the CPE; and a CPE, connected to the central office device and configured to receive data from the central office device and send data to the central office device, wherein the CPE further comprises a retransmission judging module, which is configured to: judge whether any bit error exists in the received data; send no retransmission request message to the central office device if no bit error exists; if any bit error exists, further judge whether a service to which a DTU belongs is retransmissive service data; send no retransmission request message to the central office device if the DTU includes non-retransmissive service data, or send a retransmission request message to the central office device if part or all of the data in the DTU is retransmissive service data.

9. The system according to claim 8, wherein:

the central office device is a Digital Subscriber Line Access Multiplexer (DSLAM), and the CPE is an SDL modem.

10. The system according to claim 8, wherein the central office device further comprises:

a service type sorting module, configured to sort service data into retransmissive service data and non-retransmissive service data according to different requirements of delay and/or bit error rate.

* * * * *